United States Patent [19]

Shigeta et al.

[11] Patent Number: 4,687,607

[45] Date of Patent: Aug. 18, 1987

[54] PROCESS FOR PRODUCING ELECTRODE SUBSTRATE FOR USE IN FUEL CELLS

[75] Inventors: Masatomo Shigeta, Iwaki; Kuniyuki Saitoh, Abiko; Hiroyuki Fukuda, Iwaki, all of Japan

[73] Assignee: Kureha Kagaku Kogyo Kabushiki Kaisha, Tokyo, Japan

[21] Appl. No.: 712,163

[22] Filed: Mar. 15, 1985

Related U.S. Application Data

[63] Continuation-in-part of Ser. No. 535,299, Sep. 23, 1983, abandoned.

[30] Foreign Application Priority Data

Oct. 1, 1982 [JP] Japan ................... 57-172994
Mar. 16, 1984 [JP] Japan ................... 59-52026

[51] Int. Cl.$^4$ ................... C01B 31/02; C04B 38/06; D01F 9/12; C08J 9/26
[52] U.S. Cl. ................... 264/29.5; 264/29.6; 264/44; 264/49; 264/257; 264/271.1; 264/317; 264/328.1; 428/188; 429/44
[58] Field of Search ............... 264/317, 29.6, 49, 29.5, 264/257, 271.1, 328.1, 44; 428/188; 429/44

[56] References Cited

U.S. PATENT DOCUMENTS

| | | | |
|---|---|---|---|
| 1,837,770 | 12/1931 | Gilbert | 264/29.6 |
| 3,829,327 | 8/1974 | Omori et al. | |
| 3,966,522 | 6/1976 | Hatch et al. | 264/317 X |
| 3,998,689 | 12/1976 | Kitago et al. | 162/136 |
| 4,070,514 | 1/1978 | Eatherly et al. | 264/317 X |
| 4,115,627 | 9/1978 | Christner et al. | 429/44 |
| 4,185,145 | 1/1980 | Breault | 429/34 |
| 4,282,173 | 8/1981 | Ochiai et al. | 264/317 X |

FOREIGN PATENT DOCUMENTS

| | | | |
|---|---|---|---|
| 148428 | 9/1952 | Australia | 264/317 |
| 956185 | 1/1950 | France | 264/317 |
| 905199 | 9/1962 | United Kingdom | 264/41 |
| 1330519 | 9/1973 | United Kingdom | 264/29.6 |
| 2095656 | 10/1982 | United Kingdom | . |

OTHER PUBLICATIONS

*Hackh's Chemical Dictionary*, fourth edition, completely revised and edited by Julius Grant, New York, McGraw-Hill, c 1972, pp. 534, 535, 643.
*The Condensed Chemical Dictionary*, tenth edition, revised by Gessner G. Hawley, New York, Van Nostrand Reinhold, c 1981, pp. 834, 835, 977.
*Hackh's Chemical Dictionary*, fourth edition, completely revised and edited by Julius Grant, New York, McGraw-Hill, c 1972, p. 123.

*Primary Examiner*—Philip Anderson
*Attorney, Agent, or Firm*—Oblon, Fisher, Spivak, McClelland, & Maier

[57] ABSTRACT

Disclosed herein is a process for producing a porous carbonaceous electrode substrate provided with elongated holes opening from one side to the opposite side of the electrode substrate through nearly the central region of the thickness of the substrate, for use in fuel cells, characterized by using high polymeric substance as a material for forming the elongated holes.

12 Claims, 4 Drawing Figures

PROCESS FOR PRODUCING ELECTRODE SUBSTRATE FOR USE IN FUEL CELLS

CROSS-REFERENCE TO RELATED APPLICATION

The present application is a continuation-in-part of U.S. patent application Ser. No. 535,299 filed Sep. 23, 1983; and now abandoned.

BACKGROUND OF THE INVENTION

The present invention relates to a process for producing electrode substrate for fuel cells, and more in detail, relates to a process for producing a porous carbonaceous electrode substrate having a plurality of elongated holes nearly in the central region of the thickness thereof.

Fuel cells of bipolar separator-type, which use bipolar separator obtained by subjecting the both sides of an impermeable graphitic thin plate to rib-work, have been hitherto publicly known.

Contrary to such a bipolar separator, a monopolar-type electrode substrate has been developed, which has a structure such that a porous carbonaceous thin plate is provided with a rib on one side thereof and a flat electrode surface on the other side thereof, the gaseous reactant in an electrode substrate diffusing from the ribbed surface to the flat surface of the electrode.

Of the attached drawings

Figure 1:
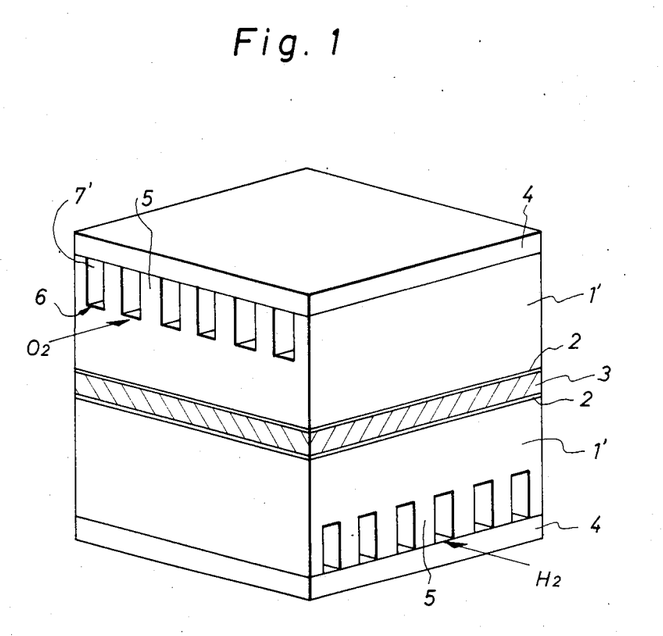
FIG. 1 is a perspective view showing a unit cell of the conventional monopolar-type cell.

The conventional monopolar-type unit cell consists, as is seen in FIG. 1, of a pair of electrode substrates 1', each having ribs 5 on one side thereof and a flat surface on the other side, a pair of catalyst layers 2, a matrix 3 impregnated with an electrolyte and a separator sheet 4, and in the case of operating the cell, a gaseous reactant which may be oxygen or hydrogen diffuses from the ribbed surface to the flat surface of the electrode substrate, respectively.

Generally, fuel cell is constructed by implying a plurality of unit cells.

Hitherto, as a process for producing electrode substrates for use in monopolar-type fuel cells, a process of press-molding short carbon fibers as the base material (refer to Japanese patent application Laying-Open No. 58-117649), a process of making paper-like material from dispersed carbon fibers (refer to Japanese Patent Publication No. 53-18603) and a process for chemical vapor deposition of carbon formed by thermal decomposition of a hydrocarbon on a web of carbon fiber (refer to U.S. Pat. No. 3,829,327) have been proposed. Every one of these porous and carbonaceous electrode substrates prepared by these conventional processes consists of one layer of a generally uniform structure.

In the cases where the thus produced uniform and single-layered electrode substrate which has a large bulk density is applied as an electrode in a fuel cell, since the gas-diffusion coefficient in the substrate is small, the limiting current density is small and the retaining amount of the electrolyte therein is not sufficient, the reduction of the performance of the cell occurs relatively earlier. Namely, such an electrode substrate has a demerit of having a short life in use.

On the other hand, in the cases where the bulk density of the uniform and single-layered electrode substrate is small, such an electrode substrate has demerits due to increase in electric resistance and in thermal resistance and due to decrease in mechanical strength such as bending strength In addition, in the case where the electrode substrate has a ribbed structure, as shown in FIG. 1, since one of its sides is not flat, for instance, the stresses focus on the sharp edge part 6 on the base of the rib 5. Namely, from the view point of the general strength, such an electrode substrate still has an un-reliable property. Accordingly, in order to make such an electrode substrate which retains the enough strength as a shaped plate, there is no choice but to increase the thickness of the flat part thereof. As a result of increasing the thickness thereof, a defect of the increased diffusion resistance occurs in the case where a gaseous reactant such as oxygen and hydrogen diffuses from the rib side to the flat surface side through the total thickness of the electrode substrate. Furthermore, it is difficult to bring the flatness of top part of the ribs to perfection and accordingly, the electric- and thermal contact resistance between the separator sheet 4 and the top of the ribs becomes so large as not to be disregarded. Generally, it is said that such a contact resistance becomes to several times as larger than the transfer resistance within the electrode substrate, and the contact resistance of the conventional monopolar-type electrode substrate is so large that there is a possibility of causing the non-uniformity of temperature in the cell and the reduction of the electrogenerating efficiency.

The object of the present invention is to solve the above-mentioned defects of the conventional carbonaceous electrode substrates.

Namely, the object of the present invention is to provide a process for producing a porous carbonaceous electrode substrate having a group of elongated holes (refer to 7 in FIG. 4), which are parallel to each other and also are parallel to the upper surface of the electrode substrate (1 in FIG. 4) and have an equivalent diameter (refer to the definition thereof shown later) of from 0.5 to 3 mm, opening from one side to the opposite side of the electrode substrate through nearly the central region of thickness of the substrate.

The present invention relates to a process for producing the porous carbonaceous electrode substrate having the group of continuous tunnels therein, and the characteristic feature of the present invention lies in the use of a high polymeric substance in the shape of a cloth-like fabric or a grating-like molding for forming the elongated holes.

By the way, the elongated holes in the porous carbonaceous electrode substrate of the present invention becomes to be the passage of the gaseous reactant in the case where the electrode substrates are actually used in the fuel cell, and such an elongated hole within the carbonaceous electrode substrate as the passage of the gaseous reactant is disclosed in Japanese Patent Publication No. 36-6123. However, the process of the present invention wherein the elongated holes are formed by integral-molding in the molding of the electrode substrate has not been known.

SUMMARY OF THE INVENTION

In an aspect of the present invention, there is provided a process for producing a porous carbonaceous electrode substrate provided with elongaged holes therein, for use in fuel cells, characterized by using high polymeric substance as a material for forming the elongated holes.

DETAILED DESCRIPTION OF THE INVENTION

The material used in the present invention as the material for forming the above-mentioned elongated holes within the electrode substrate is a high polymeric substance in a shape of cloth-like fabric or a grating-like molding.

As the high polymeric substance, a substance of a carbonization yield (at 900° C.) of less than 30% by weight is suitably selected from the group consisting of polyethylene, polypropylene, polystyrene, polyvinylalcohol and polyvinylchloride. In the case of using the high polymeric substance of the carbonization yield of over 30% by weight, there is a fear of causing difficulty in forming the elongated holes and in regulating the equivalent diameter thereof. Furthermore, of the high polymeric substances thus selected, a substance which does not show any volatilization nor melt-flow at a temperature of 100° C. should be used. Namely, the thermal deformation of the high polymeric substance at the temperature and the pressure of molding is allowable, however, the substance should not volatilize nor show melt-flow at the temperature and the pressure.

Figure 2:
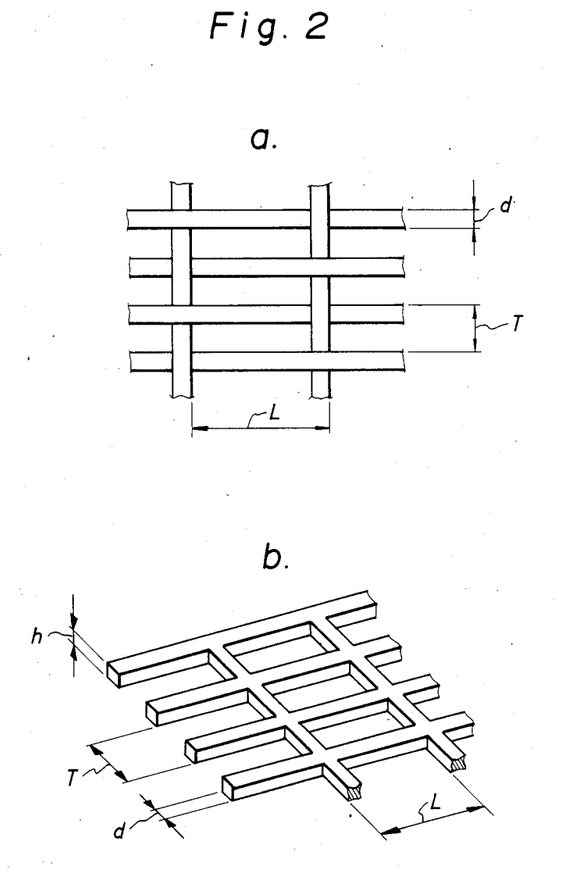
FIG. 2a is a figure showing an outline of the cloth-like fabric for forming the elongated holes in the present invention.
FIG. 2b is a figure showing an outline of the grating-like molding for forming the elongated holes in the present invention.

The cloth-like fabric which is used for forming the elongated hole having an equivalent-diameter in the range of from 0.5 to 3.3 mm within the electrode substrate of the present invention is prepared by weaving a single fiber of from 0.5 to 3.3 mm in diameter (d) made of the high polymeric substance or a bundle of from 0.5 to 3.3 mm in diameter (d) composed of a plurality of the single fibers at a distance (T) of from 1.5 to 5 mm in the direction parallel to the gas flow and at a distance (L) of from 1.5 to 50 mm in the direction perpendicular to the gas flow (refer to FIG. 2).

The grating-like molding made of the high polymeric substance and used as the same purpose as above is prepared by (1) injection-moulding of the molten high polymeric substance into a metal mold or (2) press-molding of pellets or powder of the high polymeric substance in a metal mold. The cross-section of the thus prepared grating-like molding may be an optional form such as circular-, rectangular-, square- or star-like form. Although the cross-sectional area of the grating-like molding is selected so that the diameter of an imaginary circle having the same area as the perpendicular cross-sectional area of a frame of the grating-like molding (hereinafter referred to as "the equivalent diameter of the cross-section of the grating-like molding") is in a range of from 0.5 to 3.3 mm, in the case where the cross-section of the frame is rectangular in shape, as shown in FIG. 2b, the length(d) of one of the sides of the rectangle and that (h) of the other thereof are selected from the ranges of from 0.45 to 2.7 mm and of from 0.5 to 3.0 mm, respectively, so that the equivalent diameter of the cross-section of the grating-like molding is in the range of from 0.5 to 3.3 mm. The distance (T) between the adjoining two frames of the grating-like molding parallel to the gas flow is selected to be in the range of from 1.5 to 5 mm, and that(L) between the adjoining two frames of the grating-like molding perpendicular to the gas flow is selected to be in the range of from 1.5 to 50 mm corresponding to the purpose.

The cloth-like fabric or the grating-like molding may be placed within the material in the metal mold for producing the porous carbonaceous electrode substrate so that the fabric or the molding situates nearly in the central region of the thickness of the electrode substrate, and then the material for the porous carbonaceous electrode substrate is molded by pressure together with the cloth-like fabric or the grating-like molding and subjected to after-hardening. The thus hardened material holding the cloth-like fabric or the grating-like molding is subjected to carbonization and calcination to thermal-decompose a larger part of the high polymeric substance to be dissipated as a gaseous substance except for the small part to be carbonized, thereby forming the elongated holes within the porous carbonaceous electrode substrate.

Generally, it has been confirmed that in the case of forming the elongated holes by the above-mentioned methods, the equivalent diameter of the thus formed elongated hole when the whole material is cooled to an ordinary temperature after carbonization and calcination thereof is smaller than the diameter of the original fiber of the cloth-like fabric or the equivalent diameter of the grating-like molding by from 3 to 7% and accordingly, in considering the reduction of the diameter, the diameter of the fiber of the cloth-like fabric or the quivalent diameter of the frame of the grating-like molding is selected, thereby optionally regulating the equivalent diameter of the thus formed elongated hole to a preferable size.

The porous carbonaceous electrode substrate for use in a fuel cell according to the present invention is produced as follows while using the above-mentioned material for forming the elongated holes.

Namely, after supplying a material for producing the porous carbonaceous electrode substrate comprising 10 to 50% by weight of a filling material, 20 to 40% by weight of a binding material and 20 to 50% by weight of a micropore-regulating material, the high polymeric substance for forming the elongated holes and the same material as that for producing the porous carbonaceous electrode substrate into a metal mold in the order, the thus supplied materials are press-molded, and the thus obtained press-molded material is subjected to after-hardening for at least 2 hours at the molding temperature, and then the thus hardened material was subjected to calcination at a temperature of from 800° to 3000° C. in an inert atmosphere for about one hour.

As the filling material for producing the porous carbonaceous electrode substrate, short carbon fiber, granular activated carbon and the like may be used. As the binding material thereof, phenol resin, epoxy resin, furfuryl alcohol resin, petroleum pitch and/or coal pitch or mixtures thereof may be used and as the micropore-regulating material, polyvinylalcohol, polyvinylchloride, polystyrene, polyethylene, polypropylene, sucrose and mixture thereof may be used.

As the short carbon fiber used as the filling material, carbon fiber of 5 to 30 micrometers in diameter and of 0.05 to 2 mm in length is preferable. The fibers of over 2 mm in length get intertwined between themselves in the step before molding to be fiber-ball and accordingly, the desired bulk density of and the desired distribution of micropore diameter in the porous carbonaceous electrode substrate are not available. On the other hand, in the case where the length of the fibers is below 0.05 mm, the necessitated strength of the product is not available.

In addition, the linear contraction rate of the short carbon fiber when it is calcinated at 2000° C. should be not more than 3.0%. In the case of using short carbon fibers which contract over 3.0% linearly at 2000° C., there is a fear of causing cracks in the product during the step of the calcination.

By using the short carbon fibers of the above-mentioned diameter, length and the linear contraction rate according to the present invention, it is possible to produce particularly large electrode substrates.

The binding material used in the present invention is useful for binding the carbon fibers in the porous carbonaceous electrode substrate after carbonization, and in order to obtain the electrode substrate of a desired bulk density, it is desirable that the binding material is a resin of a carbonization yield (at 900° C.) of from 30 to 75% by weight. As such a binding material, phenol resin, epoxy resin, furfuryl alcohol resin, pitch derived from petroleum and/or coal and mixtures thereof may be mentioned. Particularly, it has been found by the present inventors that powdery phenol resin or a mixture of powdery phenol resin with a powdery pitch is most preferable in the case of dry blending the starting materials and that the specific properties of the thus obtained porous carbonaceous electrode substrate are excellent. The binding material is used in an amount of 10 to 50% by weight of the mixture of the starting materials, preferably 20 to 40% by weight thereof. In the case where the amount is below 10% by weight, the electrode substrate obtained is low in mechanical strength due to the insufficiency of the amount of the binding material, and on the other hand, in the case of the amount of over 50% by weight, it is impossible to obtain the electrode substrate having the desired micropore-diameter and permeability of the gaseous reactant.

The micropore-regulating material used in the present invention is an important material for determining the micropores of the molded material of the electrode substrate. In the process according to the present invention, an organic granular substance of which more than 70% by weight are the granules of a diameter in the range of from 30 to 300 micrometers, and which does not volatilize nor show any melt-flow at a temperature of 100° C. is used to regulate the bulk density and micropore-diameter of the porous carbonaceous electrode substrate of the present invention.

Namely, the organic granular substance may show thermal deformation at the temperature and the pressure of molding the mixture of raw materials for producing the electrode substrate of the present invention, however, it should not volatilize nor show any melt-flow under the above conditions.

In consideration of the above-mentioned requirements, as the preferable micropore-regulator, a substance of a carbonization yield of less than 30% by weight is selected suitably from the group consisting of polyvinylalcohol, polyvinylchloride, polyethylene, polypropylene, polystyrene, sucrose and mixtures thereof. In the case of using a substance of a carbonization yield of over 3.3% by weight, there is a fear of causing difficulty in regulating the bulk density and micropore-diameter of the thus obtained porous carbonaceous electrode substrate.

The amount of the micropore-regulating material is selected in the range of from 20 to 50% by weight of the mixture of raw materials for producing the electrode substrate of the present invention in line with the desired bulk density and micropore-diameter thereof. In addition, in the cases of blending the filling material (A % by weight of the blended mixture), the binding material (B % by weight of the blended mixture) and the micropore-regulating material (C % by weight of the blended mixture), a desirable result is obtained by regulating the amounts of the respective components so that $(A+C)/B$ is in the range of from 1.5 to 4.0. In the case where $(A+C)/B$ is not in the above-mentioned range, it is difficult to obtain the porous carbonaceous electrode substrate of which the bulk density, the bending strength, the gas-permeability (to oxygen and hydrogen) and electric resistance are satisfactory. More in detail, in the present invention, in the case where A is selected in the range of from 10 to 50 and also C is selected in the range of from 20 to 50, it is preferable to select B in the range of from 20 to 40.

Molding of the blended mixture of the raw materials for producing the porous carbonaceous electrode substrate of the present invention is carried out by a conventional press-molding method.

Namely, after supplying the blended mixture of the materials for producing the porous carbonaceous electrode substrate into a metal mold for press-molding, the material for forming the elongated holes is supplied on the thus supplied blended mixture and then the same blended mixture is further supplied on the thus supplied material for forming the elongated holes, and press-molding is carried out on the thus supplied materials at a metal mold temperature of 70° to 170° C., under a molding pressure of 5 to 100 kg/cm$^2$ for 1 to 60 min.

After finishing the press-molding, the thus obtained molded material is kept at the molding temperature for at least 2 hours for after-hardening and the thus hardened material was subjected to calcinate in an inert atmosphere for about one hour at a temperature in a range of from 800° to 3000° C. In the step of the thermal decomposition of the molding at a low temperature, it is preferable to raise the temperature slowly, for instance, at a rate of 100°±50° C./hour up to about 700° C. for preventing the occurrence of a stress due to the rapid contraction of the material as a result of the gasification of some components of the starting materials.

In the case where the calcination temperature is too rapidly raised in the above step of thermal decomposition, interlayer exfoliation and occurrence of cracks are caused in the product.

The porous carbonaceous electrode substrate produced by the above-mentioned process is high in mechanical strength thereof, for instance, in bending strength, and can be obtained as a thin plate which has a thin diffusion layer of the gaseous reactant.

Accordingly, in the case of applying the thus obtained electrode substrate in a fuel cell, the resistance to the diffusion of the gaseous reactant is small and the current density thereof is large enough.

The porous carbonaceous electrode substrate for use in fuel cell, produced according to the process of the present invention is explained more in detail as follows.

Figure 3:
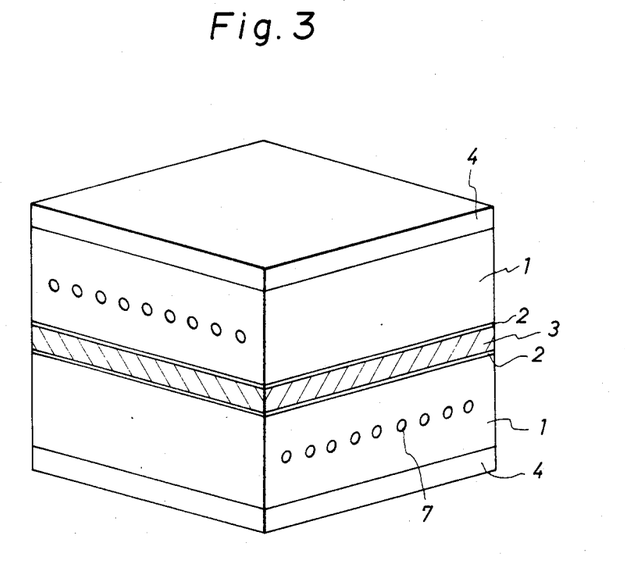
FIG. 3 is a perspective view showing a unit cell comprising the electrode substrates according to the present invention and FIG. 4 is a figure showing the principal dimensions of the electrode substrate produced in Example 1 of the present invention.

The structure of the electrode substrate obtained by the process according to the present invention is shown in FIG. 3.

The electrode substrate 1 according to the present invention is provided with a plurality of elongated holes 5 located preferably at the central region of the thickness thereof which is parallel to the upper surface of the electrode substrate.

The elongated holes of the present invention are parallel to each other and to the upper surface and the lateral surface of the electrode substrate, and continue from their openings in the one side to other openings in the opposite side.

In FIG. 3, the one electrode substrate is piled on the another electrode substrate while holding two catalyst layers 2, a matrix 3, thereby forming a unit cell combining a separator sheet 4, wherein the direction of elongated holes is perpendicular to the direction of elongated holes in the another electrode substrate.

The shape of the cross-section of the elongated hole 7 may be optional, for instance, may be circular as are seen in FIG. 3. The equivalent diameter of the continuous tunnel (loc. cit.) is preferably in a range of from 0.5 to 3 mm, and in the case where the elongated holes of the equivalent diameter of below 0.5 mm are formed in an electrode substrate of a larger area, the resistance to diffusion of the gaseous reactant becomes too large because of the small diameter and the long span of the elongated holes through the electrode substrate. On the other hand, in the case where the equivalent diameter is over 3 mm, the thickness of the layer of porous carbonaceous material becomes too large, thereby reducing the volumetric generating efficiency of the cell prepared by piling the electrode substrates.

The porous carbonaceous electrode substrate 1 according to the present invention comprises a uniform, porous carbonaceous material of a mean bulk density of from 0.3 to 1.0 g/cm$^3$, preferably from 0.4 to 0.8 g/cm$^3$ and a preferable rate of gas permeation of higher than 20 ml/cm. hour.mmAq. The porous carbonaceous electrode substrate showing the average bulk density and the rate of gas permeation shows a preferable mechanical strength, for instance, bending strength, and a preferable low resistance to diffusion of the gaseous reactant.

In addition, the micropores in the electrode substrate are opened to a whole surface thereof, and it is preferable that more than 60% by volume of the micropores have a diameter in a range of from 10 to 100 micrometers.

The bending strength of the electrode substrate according to the present invention is fairly large compared with the conventional ribbed electrode substrate having same thickness as the present substrate because of the location of the elongated holes approximately in the central region of the thickness of the electrode substrate. Accordingly, the thickness of the electrode substrate may be made smaller than that of the conventional electrode substrate. As a result, there are merits of having a thinner gas-diffusion layer and therefore a smaller resistance to diffusion of gases, thereby exhibiting a large current density of a fuel cell.

In addition, since it is possible to keep the electrode substrate and the separator sheet (4 in FIG. 3) into allover contact, thereby making it possible to reduce the electric- and thermal contact resistance between the two, the electrode substrate according to the present invention may be said to be an ideal electrode substrate.

In this connection, as compared with the electrode substrate of carbon fiber-paper type produced by a paper-making process, the electrode substrate according to the present invention has a larger bending strength and it is not necessary to be ribbed. Accordingly cost-reduction and reduction of electric resistance are expected in the electrode substrate according to the present invention.

In addition, since the elongated holes can be formed simultaneously with the electrode substrate by integral-molding, there is an effect of simplifying the production steps.

In order to show further the excellent specific properties of the electrode substrate produced according to the present invention, the values of the specific properties of an example of the electrode substrates of the present invention are compared with those of an example of the conventional electrode substrates of monopolar-type provided with ribs (refer to FIG. 1), determined under the same conditions, in Table 1.

TABLE 1

| | Electrode substrate | |
|---|---|---|
| Property | Conventional type | Present invention |
| Thickness of an electrode substrate (mm) | 2.4 | 2.0 |
| Thickness of a cell[1] (mm) | 5.8 | 5.0 |
| Bending strength of an electrode substrate (kg/cm$^2$) | 100 | 150 |
| Compression strength of an electrode substrate (kg/cm$^2$) | 100 | 110 |
| Electric resistance (m Ω per 1 cm$^2$) | | |
| electrode substrate | 8 | 6 |
| contact resistance[2] | 30 | 20 |
| a whole cell[3] | 77 | 53 |
| Thickness of gas-diffusion layer (mm) | 1.2 | 0.5 |
| Limiting current (mA/cm$^2$) | 400 | 500 |
| Generated output/vol.[4] (kw/m$^3$) | 207 | 240 |

Notes:
[1] A unit cell consists of a separator sheet, an electrode substrate, a matrix (a layer of electrolyte solution) and another electrode substrate, the thickness of the separator sheet and that of the matrix being both 0.5 mm.
[2] Contact resistances between the separator sheet and the electrode substrate under a contact pressure of 1 kg/cm$^2$.
[3] Sum of the total sum of resistances of all the components of a unit cell and the total sum of contact resistances, the resistance of a separator sheet being 1 m Ω.
[4] at 200 mA/cm$^2$ The present invention will be illustrated while referring to the following non-limiting Example. It will be understood that various modifications may be carried out by those skilled in the art without difficulty and those variations will be included in the present invention.

In the Example, the "porosity P (%)" was determined by the following equation while assuming that the real density of a carbonaceous substrate was 1.6 glcm$^3$;

$$P = (1 - \rho_b/1.6) \times 100$$

wherein $\rho_b$ was the measured bulk density (g/cm$^3$) of a specimen, the "bending strength (kg/cm$^2$)" of a porous carbonaceous electrode substrate was determined according to Japanese Industrial Standards (JIS) K-6911/1970 while using a specimen with a dimension of 100×10×2.5 mm, and the "mean diameter of micropores (μm)" of a specimen was measured by a mercury porosimeter (manufactured by Carlo Erba Strumentazione, Italia). The "rate of permeation of a gas $Q_s$ (ml/cm. hr.mmAq.)" was determined in the following manner: a cylindrical specimen of 90 mm in diameter and t mm in thickness was cut out from a substrate to be measured, the circumferential side surface of the specimen was treated with a thermosetting resin so that gas might not permeate therethrough, both longitudinal end surfaces of the specimen were then put between two cylindrical gas tubes with flange holding a gasket, a predetermined amount (10 l/min of air was supplied from one end of the specimen to the other end thereof which was open to the atmosphere, the pressure loss between two ends of the specimen was measured by a manometer attached to the upstream of the gas tube and the specific gas permeability $Q_s$ was then calculated by the following equation;

$$Q_s = \frac{6 \times t \times 10^4}{50.24 \times \Delta p}$$

wherein $\Delta p$ was the measured pressure loss (mmAq.) and 50.24 cm$^2$ was a real area to be measured (a circle of 80 mm in diameter). Further, the "electric resistance $\rho V$ ($\Omega$cm)" was determined in the following manner: both ends of a specimen were coated with an electroconductive coating material and an electrical resistance between two ends of the specimen was measured according to SRIS (Standards of Japan Rubber Association) 2301-1969, and then the volume resistivity was calculated by the following equation;

$$\rho V = R \cdot w \cdot t / l$$

wherein R was the measured resistance ($\Omega$) between the ends of the specimen, l (cm) was a longitudinal length (direction to be measured), and w (cm) and t (cm) were a horizontal and a vertical lengths, respectively, defining a cross section of the specimen.

EXAMPLE 1

Production of an electrode substrate according to the present invention (1-1) Preparation of a grating-like molding of polypropylene A grating-like molding of polypropylene with a shape as shown in FIG. 2b for forming the elongated holes was prepared by melt-extruding commercialized pellet-like polypropylene (Model J-215, made by Ton-en-Petroleum Co., Ltd.) at 230° C. under an injecting pressure of 500 kg/cm$^2$ while using a screw-type injection molding machine into a metal mold kept at about 50° C. The metal mold had been made by providing channels which give the following dimensions to the thus molded grating-like molding on a stainless-steel plate and the metal mold was provided with a separable covering plate of stainless-steel:

(1) d—1 mm, (2) h—1 mm, (3) T=2.5 mm and (4) L=40 mm.

(2-2) Production of the electrode substrate

A mixture consisting of 40% by weight of short carbon fibers of 14 micrometers in an average diameter and 0.4 mm in an average length (Model M 104 S made by Kureha Chemical Industry Co., Ltd.), 30% by weight of granules of polyvinylalcohol alcohol of 180 micrometers in a mean diameter (made by Nippon Gosei Chemical Co., Ltd.), as a micropore regulating material and 30% by weight of a phenol resin as a binding material (made by Asahi Yukizai Co., Ltd.), was supplied to a metal mold for press-molding, and then the grating-like molding prepared in 1-1) for forming the elongated holes was supplied onto the mixture supplied previously into the metal mold. Thereafter, the same mixture as above was further supplied onto the grating-like molding already supplied into the mold.

The thus supplied materials were press-molded at 140° C. for about 30 min under a pressure of 50 kg/cm$^2$, and then subjected to after-hardening at 140° C. for about 2 hours under a pressure of 0.5 kg/cm$^2$. The thus after-hardened material was slowly heated up to 700° C. at a raising rate of 100° C./hour and then subjected to calcination for about 1 hour at 2000° C. in an inert atmosphere.

Figure 4:
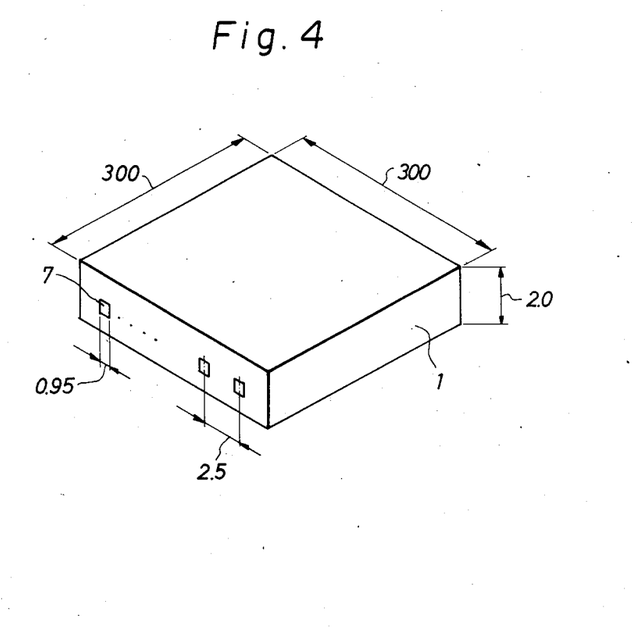

The representative dimensions of the thus obtained electrode substrate are shown in FIG. 4 in mm, and the physical properties thereof are shown in Table 2. The cross-sectional shape of the continuous tunnels formed in the electrode substrate was almost square with a length of side thereof of about 0.95 mm.

TABLE 2

| Dimension | Product of Example 1 | Remarks |
|---|---|---|
| Bulk density | 0.51 g/cm$^3$ | including the elongated hole parts |
| Porosity | 74% | same as above |
| Rate of permeation of a gas[1] | 120 ml/cm · hour · mmAq. | through the porous carbonaceous material of the electrode substrate |
| Bending strength | 142 kg/cm$^2$ | |
| Electric resistance | 27 × 10$^{-3}$ $\Omega$cm | |
| Mean diameter of micropores | 38 micrometers | not including the elongated hole parts |

Note:
[1]Measured by using air as the gas

What is claimed is:

1. A process for producing a porous carbonaceous electrode substrate provided with a group of elongated holes for reactant gases for fuel cells comprising the steps of (a) introducing into a metal mold of predetermined shape and dimension, in order, (1) a first amount of a first material for producing said porous carbonaceous electrode substrate comprising 10 to 50% by weight of a filling material which is short carbon fibers or granular activated carbon, 20 to 40% by weight of a binding material which is selected from the group consisting of phenol resin, epoxy resin, furfuryl alcohol resin, pitch derived from petroleum or coal and mixtures thereof and shows a carbonization yeild of 30 to 75% by weight, and 20 to 50% by weight of a micropore-regulating material which is selected from the group consisting of polyvinylalcohol, polyvinylchloride, polystyrene, polyethylene, polypropylene, sucrose and mixtures thereof, (2) a high polymeric substance in the shape of a cloth-like fabric or a grating-like molding for forming the elongated holes, which substance is selected from the group consisting of polyethylene, polypropylene, polystyrene, polyvinylalcohol and polyvinylchloride and gives a carbonization yield of lower than 30% by weight and (3) a second amount of said first material for producing said porous carbonaceous electrode substrate, (b) press-molding the thus provided materials in the metal mold heated to from 70° to 170° C. under a molding pressure of from 5 to 100 kg/cm$^2$ for from 1 to 160 min, (c) subjecting the thus press-molded material to after-hardening, and (d) then further calcinating the thus after-hardened material in an inert atmosphere at a temperature from 800° to 3,000° C. to thermal-decompose a larger part of said high polymeric substance to be carbonized, thereby forming said porous carbonaceous electrode substrate provided with said group of elongated holes opening from one side to the opposite side of the electrode substrate through nearly the central region of the thickness of the substrate.

2. A process according to claim 1, wherein said obtained porous carbonaceous electrode substrate comprises a uniform, porous carbonaceous material of a mean bulk density of from 0.3 to 1.0 g/cm$^3$.

3. A process according to claim 2, wherein said mean bulk density is from 0.4 to 0.8 g/cm$^3$.

4. A process according to claim 1, wherein said high polymeric substance does not volatilize nor show any melt-flow flow at a temperature of 100° C.

5. A process according to claim 1, wherein said high polymeric substance in the shape of said cloth-like fabric has an equivalent diameter of 0.5 to 3.3 mm and is prepared by weaving single filaments of 0.5 to 3.3 mm in diameter made of said high polymeric substance or bundles of 0.5 to 3.3 mm in diameter formed by tying a plurality of single filaments made of said high polymeric substance.

6. A process according to claim 5, wherein the distance between the adjoining two single filaments or bundles of said cloth-like fabric is 1.5 to 5 mm in the direction parallel to the direction of a gaseous reactant flow in said electrode substrate when applied in a fuel cell, and is 1.5 to 50 mm in the direction perpendicular to said direction of said gaseous reactant flow.

7. A process according to claim 1, wherein said high polymeric substance in the shape of said grating-like molding is prepared by injection molding said high polymeric substance in a molten state into a metal mold or is prepared by press-molding pellets or powder of said high polymeric substance in a metal mold so that the equivalent diameter of the cross-section of frames of said grating is 0.5 to 3.3 mm.

8. A process according to claim 7, wherein the distance between the adjoining two frames of grating in said grating-like molding is 1.5 to 5 mm in the direction parallel to the direction of a gaseous reactant flow when applied in a fuel cell, and is 1.5 to 50 mm in the direction perpendicular to the direction of said gaseous reactant flow.

9. A process according to claim 1, wherein said short carbon fibers are 5 to 30 mm in diameter and 0.05 to 2 mm in length and give a linear contraction rate of not more than 3.0% when carbonized and calcinated at 2,000° C. in an inert atmosphere.

10. A process according to claim 1, wherein more than 70% by weight of said micropore-regulating material has a diameter of from 30 to 300 mm.

11. A process according to claim 1, wherein said afterhardening is carried out for at at least 2 hours at a temperature of said press-molding.

12. A process according to claim 1, wherein said calcinating is carried out for about one hour.

* * * * *

UNITED STATES PATENT AND TRADEMARK OFFICE
CERTIFICATE OF CORRECTION

PATENT NO. : 4,687,607
DATED : August 18, 1987
INVENTOR(S) : Masatomo Shigeta, et al.

It is certified that error appears in the above-identified patent and that said Letters Patent is hereby corrected as shown below:

In column 9, line 20, delete "$\rho V$", and insert therefor --$\rho_V$--;

In column 9, lines 28 to 29, delete "$\rho V = R \cdot w \cdot t \ell$", and insert therefor --$\rho_V = R \cdot w \cdot t / \ell$--;

In column 9, line 54, delete "(1)d-1mm", and insert therefor --(1)d=1mm--;

In column 9, line 54, delete "(2)h-1mm", and insert therefor --(2)h=1mm--.

Signed and Sealed this

Ninth Day of February, 1988

Attest:

DONALD J. QUIGG

Attesting Officer

Commissioner of Patents and Trademarks